United States Patent [19]

Witte

[11] Patent Number: 5,437,135
[45] Date of Patent: Aug. 1, 1995

[54] DIAGONAL STRUT FOR A SYSTEM FOR THE CONSTRUCTION OF ARRANGEMENTS USED FOR MOUNTING WORKPIECES

[75] Inventor: Horst Witte, Nahrendorf, Germany

[73] Assignee: Horst Witte Entwicklungs und Vertriebs-KG, Nahrendorf, Germany

[21] Appl. No.: 80,961

[22] Filed: Jun. 22, 1993

[30] Foreign Application Priority Data

Jul. 2, 1992 [EP] European Pat. Off. ............ 92111207

[51] Int. Cl.⁶ .......................... E04C 3/02; B23Q 3/02
[52] U.S. Cl. .................................. 52/693; 52/650.2; 52/638; 446/105
[58] Field of Search ...................... 52/696, 693, 648.1, 52/650.2, 638, 677, 720; 446/85, 105, 107, 111, 115, 476

[56] References Cited

U.S. PATENT DOCUMENTS

| 2,152,189 | 3/1939 | Henderson | 52/693 |
| 2,733,786 | 2/1956 | Drake | 52/720 X |
| 4,102,108 | 7/1978 | Cody | 52/693 |

FOREIGN PATENT DOCUMENTS

| 0222147B1 | 5/1987 | European Pat. Off. | |
| 0229017 | 2/1925 | United Kingdom | 52/693 |

Primary Examiner—Carl D. Friedman
Assistant Examiner—Robert J. Canfield
Attorney, Agent, or Firm—Friedrich Kueffner

[57] ABSTRACT

A diagonal strut for a system for the construction of arrangements used for mounting workpieces on machine tool tables in a defined and reproducible position. The system includes a base plate and receiving members connected to each other by the diagonal strut. The base plate and the receiving members have connecting bores whose axes are arranged spaced from each other at unit spacings. The diagonal strut has transverse connecting bores whose axes are spaced apart at a distance which corresponds to five times the unit spacing or a multiple thereof. Two end faces are arranged at each end of the diagonal strut. The end faces extend at a right angle relative to each other and one of the end faces includes an angle of 36.87° with a centerline extending through the axes of the transverse connecting bores and the other end face includes an angle of 53.13° with the centerline. The two end faces at the ends of the diagonal strut including the same angle with the centerline are arranged on opposite sides of the diagonal strut. Each end face is spaced from the axis of the adjacent transverse connecting bore by half a unit spacing. End connecting bores extend perpendicularly to each end face and through the axis of the adjacent transverse connecting bore.

9 Claims, 2 Drawing Sheets

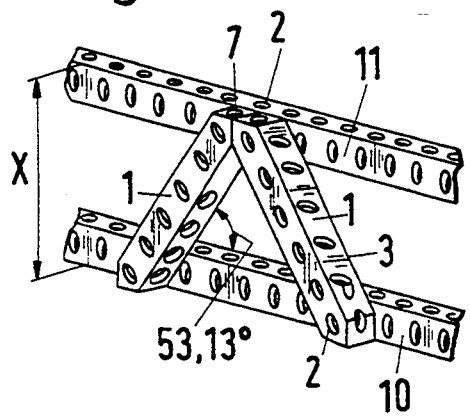
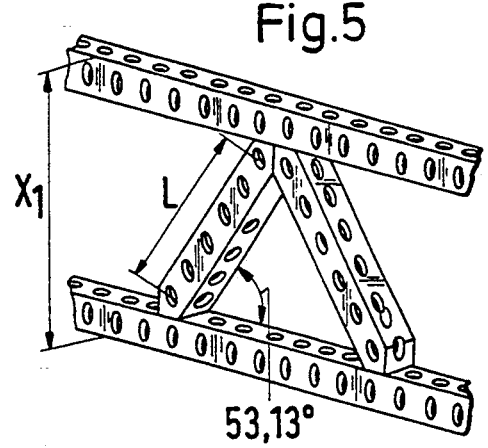
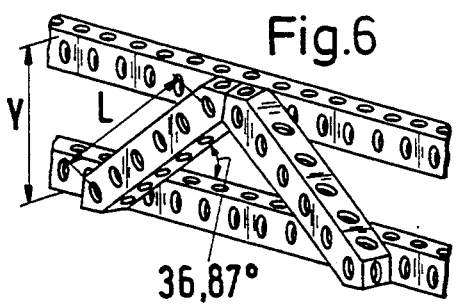
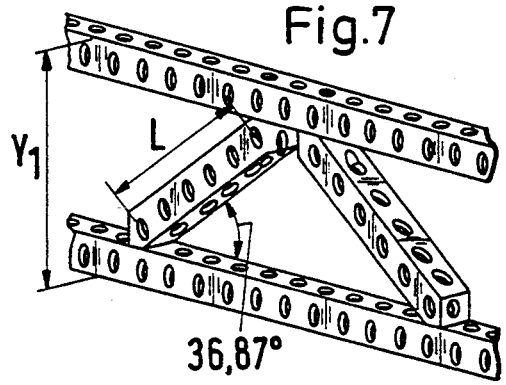
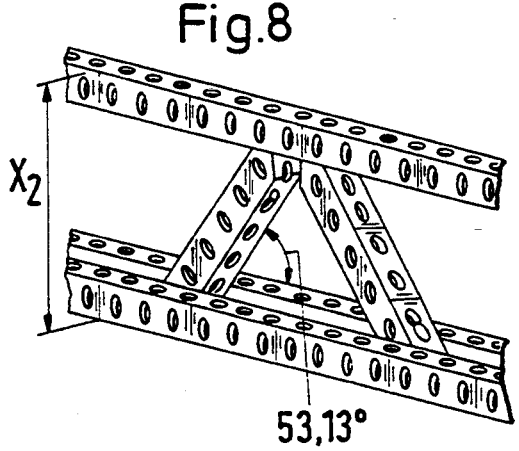
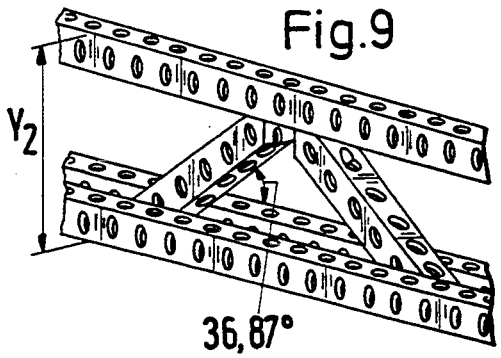

DIAGONAL STRUT FOR A SYSTEM FOR THE CONSTRUCTION OF ARRANGEMENTS USED FOR MOUNTING WORKPIECES

BACKGROUND OF THE INVENTION

1. Field of the Invention

The present invention relates to a diagonal strut for a system for the construction of arrangements used for mounting workpieces on machine tool tables in a defined and reproducible position. The system includes a base plate which can be placed on the machine tool table. The base plate has connecting bores for fastening receiving members. The connecting bores extend perpendicularly to each other and are arranged at unit spacings or intervals. The receiving members also have connecting bores which are arranged at the same spacings or intervals as those of the base plate.

2. Description of the Related Art

A system of the above-described type is known from European Patent 222 147. This system uses special tight-fit screws and nut components and makes possible a versatile, precise and reproducible construction of arrangement systems for machine tools, particularly measuring machines. A large variety of different combinations are possible using few basic elements, i.e., combinations using few base plates and receiving members.

If larger systems are to be constructed in which the individual base plates and/or receiving members to be connected are to have a distance therebetween which corresponds to a predetermined unit spacing, a lattice-system would be the correct possibility of construction because such a system is stable and lightweight. The system may be arranged in a single plane, or it may be a three-dimensional system. The individual components of the known system are not suitable because the diagonal arrangement makes it difficult or even impossible to maintain the unit spacing within the distance between the components to be connected.

SUMMARY OF THE INVENTION

Therefore, it is a primary object of the present invention to provide a diagonal strut of the above-described type which makes possible the construction in the manner of a lattice-type system which has the required stability, wherein the unit spacing between the individual components to be connected is maintained, i.e., the distance between base plates and/or receiving members.

In accordance with the present invention, a diagonal strut of the above-described type has the following features:

(1) Transverse connecting bores whose axes are spaced apart at a distance which corresponds to five times, or a multiple thereof, the unit spacing between the axis of the connecting bores in the base plate and/or the receiving members;

(2) Two end faces at each end of the diagonal strut, wherein the end faces extend at a right angle relative to each other, wherein one of the end faces includes an angle of 36.87° with a centerline extending through the transverse connecting bores and the other end face includes an angle of 53.13° with the centerline extending through the transverse connecting bores, and wherein the two end faces at the ends of the diagonal strut including the same angle with the centerline extending through the transverse connecting bores are arranged on opposite sides of the diagonal strut;

(3) Each end face is spaced from the axis of the adjacent transverse connecting bore by half a unit spacing; and (4) End connecting bores extending perpendicularly to each end face and through the axis of the adjacent transverse connecting bore.

In accordance with an advantageous feature, the diagonal strut may have a rectangular or square cross-section, wherein preferably the height and the width of the strut corresponds to the unit spacing or a multiple thereof. The transverse connecting bores and the end connecting bores, in turn, are arranged in such a way that they are adapted to the unit spacings of the base plate and/or the receiving members.

The present invention is based on the principle resulting from the Pythagorean theorem. The distance between the axis of the transverse connecting bores of the diagonal strut corresponds to the length of the hypotenuse of a right triangle. By arranging the diagonal strut at the above-mentioned angles of 36.87° or 53.13°, the sides of the triangle have a length which corresponds to three or four times the unit spacing, so that the parts to be connected, i.e., the base plate and/or receiving members, can be arranged at a distance of three times or four times the unit spacing and that the regularity resulting from the unit spacings is maintained throughout the entire construction. The arrangement of the end faces which include the same angle with the centerline extending through the transverse connecting bores on opposite sides of the diagonal strut results in a versatility which makes it possible to carry out additional "distance steps" between the components corresponding to the single unit spacing. This is achieved by arranging the diagonal strut next to the components to be connected, between the components to be connected, or one end next to and the other end between the components to be connected. This provides another possibility when using the diagonal strut according to the present invention to arrange the components to be connected in "distance steps" relative to each other which correspond to the single unit spacing. The diagonal struts can be arranged alternatingly as in a lattice-type system which is lightweight and stable. The lattice-type system may be arranged in a single plane or the lattice-type system may be three-dimensional. At the points of intersection, the diagonal struts may abut directly against each other and may be additionally supported by the adjacent end faces. In addition, the end faces can be utilized for a frictionally engaging support and a form-locking support.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described a preferred embodiment of the invention.

BRIEF DESCRIPTION OF THE DRAWINGS

In the drawing:

FIG. 4 is a perspective view, on a smaller scale, illustrating a first connecting possibility of diagonal struts with a base plate and a receiving member;

FIG. 5 is a perspective view, corresponding to FIG. 4, showing a second connection possibility;

FIG. 6 is a perspective view showing a third connection possibility;

FIG. 7 is a perspective view showing a fourth connection possibility;

FIG. 8 is a perspective view showing a fifth connection possibility; and

FIG. 9 is a perspective view showing a sixth connection possibility.

DETAILED DESCRIPTION OF THE PREFERRED EMBODIMENTS

Figure 1:
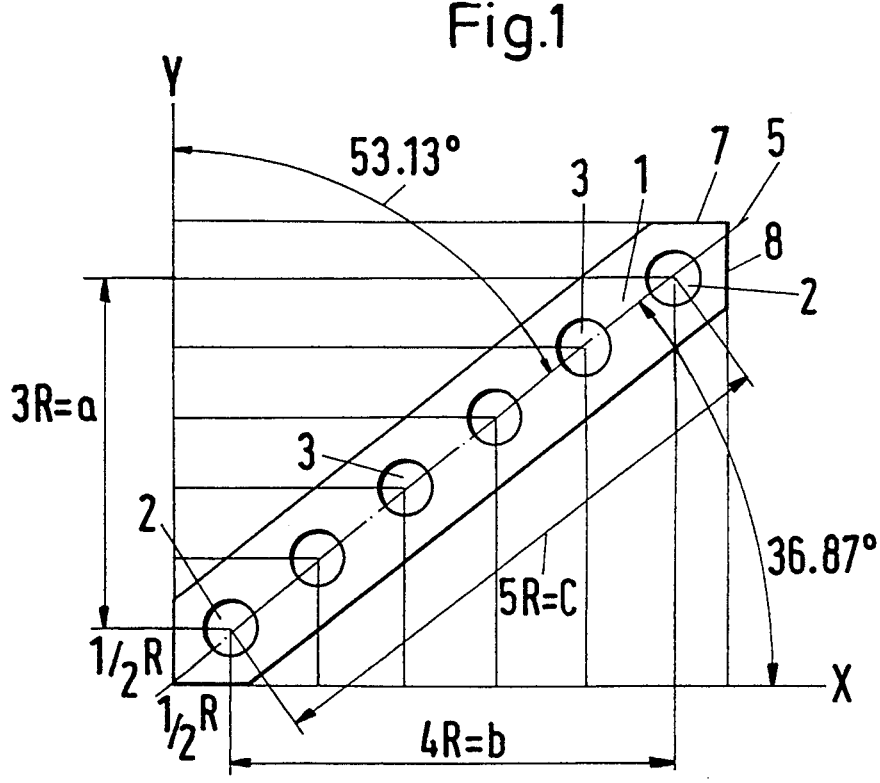
FIG. 1 is a side view of a diagonal strut according to the present invention illustrated in a system of coordinates.
Figure 2:
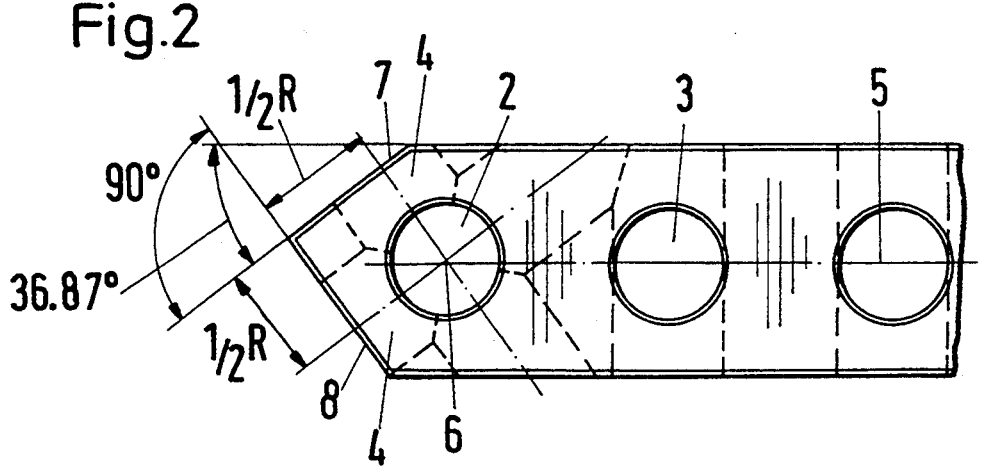
FIG. 2 is a side view, on a larger scale, of an end of the diagonal of FIG. 1.
Figure 3:
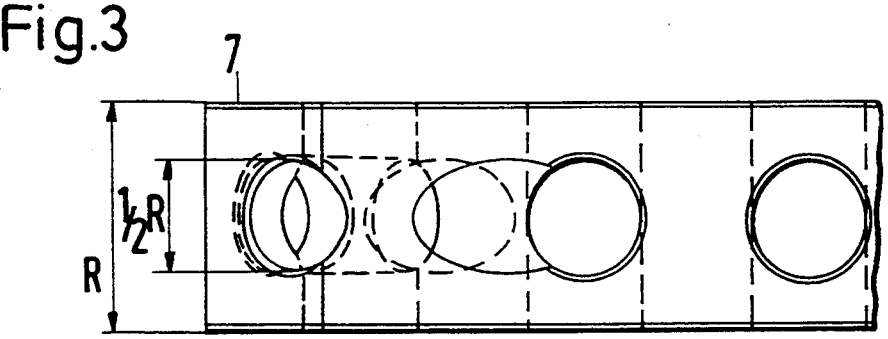
FIG. 3 is a top view of the portion of the diagonal strut shown in FIG. 2.

The diagonal strut 1 illustrated in FIGS. 1-3, as it is used, for example, for constructing a lattice-type system shown in FIG. 4, represents the simplest embodiment of the diagonal strut according to the present invention.

The principle of the diagonal strut according to the present invention can best be explained in connection with FIG. 1.

The system known from the above-mentioned EP-PS 222 147 has connecting bores in the components to be connected, i.e., the base plate and/or receiving members. The connecting bores are illustrated and described as tight-fit bores and are arranged at a certain unit spacing relative to each other.

If a diagonal strut for this known system is to be created, the angle at which the diagonal strut is positioned poses the problem that the unit spacing is "interrupted". This problem is avoided when using the diagonal strut according to the present invention.

The diagonal strut 1 illustrated in FIG. 1 in a side view has at each end a transverse connecting bore 2 whose axis extends perpendicularly to the top and bottom surfaces of the diagonal strut 1 which, in turn, extend parallel to the plane of the drawing of FIG. 1. The axes 6 of the transverse connecting bores are spaced apart by a distance $c = 5 R$; in other words, the distance between the axes 6 of the transverse connecting bores equals five unit spacings. The centerline 5 through the axes 6 of the two transverse connecting bores 2 extends at an angle of 36.87° relative to the X-axis and at angle of 53.18° relative to the Y-axis. This configuration results at the ends of the diagonal strut in end faces 7 and 8 which extend at a right angle relative to each other and at angles of 36.87° and 53.13°, respectively, relative to the centerline 5. This special geometric arrangement means that the distance a in the vertical direction, i.e., in the direction of the Y-axis, corresponds to three unit spacings 3 R and the distance b in the horizontal direction, i.e., in the direction of the X-axis, corresponds to four unit spacings 4 R. This is due to the Pythagorean Theorem according to which the square of the length of the hypotenuse c equals the sum of the squares of the lengths of the sides a and b. As indicated in FIGS. 1 and 2 of the drawing, the axis 6 of each transverse connecting bore 2 is spaced from the adjacent end faces 7 and 8 by half a unit spacing, i.e., by ½ R.

In addition, end connecting bores 4 are provided at the ends of the diagonal strut 1, wherein the end connecting bores 4 extend from and perpendicularly to the end faces 7 and 8. The axes of the end connecting bores 4 extend through the axis 6 of the transverse connecting bore 2 and through the point of intersection of the axis 6 with the centerline 5. In other words, in addition to the two transverse connecting bores 2 at the ends of the diagonal strut 1, two end connecting bores 4 extending perpendicularly to the respective end faces are provided at each end of the diagonal strut 1.

Connecting bores 3 illustrated in the figures of the drawing may additionally be provided, however, the bores 3 are not essential for carrying out the present invention. The connecting bores 3 are advantageously spaced apart by the unit spacing, so that additional basic elements can be mounted, such as, stop members, support blocks and the like.

The diagonal strut 1 illustrated in the drawing has a square cross-section.

The surface of the diagonal strut 1 extending in the X/Y-plane of FIG. 1 has a height which corresponds to a unit spacing. The diameters of the transverse connecting bores 2 and of the end connecting bores 4 correspond to half a unit spacing. In the illustrated embodiment, the width of the diagonal strut 1 extending perpendicularly to the plane of the drawing of FIG. 1 also corresponds to a unit spacing. However, the width may also be greater, preferably 2 R so that the diagonal strut has a rectangular cross-section with a height of 1R and a width of 2R.

In addition to the use of the diagonal strut for constructing different lattice-type systems which extend in a plane or three-dimensionally, the diagonal strut can also be used for additionally supporting a right angle between two base plates and/or between a base plate and a receiving member, such that the right angle extends obliquely with the angles of 53.13° and 36.87°.

FIGS. 4 to 9 illustrate various basic principles for connecting a base plate and a receiving member by means of diagonal struts according to the present invention. It is not significant in this connection whether a base plate is connected to a receiving member, or whether only base plates and only receiving members are connected to each other. In FIGS. 4 to 9, the base plate is denoted by reference numeral 10 and the receiving member by reference numeral 11.

In the connection illustrated in FIG. 4, the two diagonal struts 1 are placed laterally next to the base plate 10 and the receiving member 11. The angle between each diagonal strut 1 and the horizontal is 53.13°. As is also evident from FIG. 4, the two end faces 7 at the upper ends of the diagonal struts 1 are placed against each other in this type of connection. This is possible because the distance of each end face 7 and of each end face 8 from the centerline of the transverse connecting bores 2 corresponds to half a unit spacing. The distance between the axes of the transverse connecting bores 2 is denoted by L in FIGS. 5, 6 and 7 of the drawing. The distance L equals 5 R. In the connection illustrated in FIG. 4, the vertical distance between base plate 10 and receiving member 11 equals 4 R. The indicated dimension X differs from 4 R in that it additionally includes half a height of the diagonal strut at each end, i.e., a unit spacing. Thus, the dimension X indicates the total height. The dimensions L and X are listed in a table reproduced below.

The construction of FIG. 6 corresponds to that illustrated in FIG. 4, however, with the difference that the diagonal struts are mounted in such a way that the angle between the diagonal struts and the horizontal is 36.87°. As a result, the vertical distance between the axes of the connecting bores of the components to be connected equals 3 R. The total height is designated by Y.

Other possibilities of connection are illustrated in FIGS. 5, 7 and 9. In the table reproduced below, the individual distances X and Y must be reduced by a unit spacing R if the vertical distance between the axes of the transverse connecting bores is to be determined.

FIGS. 4 to 9 of the drawing further show that the ends of the diagonal struts may be arranged and mounted so as to immediately abut each other. On the other hand, it is also possible to provide an additional vertical center strut.

Steps or jumps by a unit spacing each in the total height can be achieved by arranging the diagonal struts next to, between or next to and between the components 10 and 11 to be connected. This results from the following table in which the unit spacing is 25. Of course, other unit spacings, such as 20 or 40 are also possible. This changes the dimension c shown in FIG. 1 which corresponds to the dimension L in FIGS. 4 to 9 and which, in turn, is equal to 5 R.

| Designation | L = 5R | X | $X_1$ | $X_2$ | Y | $Y_1$ | $Y_2$ |
| --- | --- | --- | --- | --- | --- | --- | --- |
| Strut 125 × 25 × 25 | 125 | 125 | 175 | 150 | 100 | 150 | 125 |
| Strut 250 × 25 × 25 | 250 | 225 | 275 | 250 | 175 | 225 | 200 |
| Strut 375 × 25 × 25 | 375 | 325 | 375 | 350 | 250 | 300 | 275 |
| Strut 500 × 25 × 25 | 500 | 425 | 475 | 450 | 325 | 375 | 350 |
| Strut 625 × 25 × 25 | 625 | 525 | 575 | 550 | 400 | 450 | 425 |
| Strut 750 × 25 × 25 | 750 | 625 | 675 | 650 | 475 | 525 | 500 |
| Strut 875 × 25 × 25 | 875 | 725 | 775 | 750 | 550 | 600 | 575 |
| Strut 1000 × 25 × 25 | 1000 | 825 | 875 | 850 | 625 | 675 | 650 |

The invention is not limited by the embodiment described above which is presented as an example ,only but can be modified in various ways within the scope of protection defined by the appended patent claims.

I claim:

1. A system for mounting workpieces in a defined and reproducible position, the system comprising at least two receiving members on which a workpiece can be mounted, each receiving member having connecting bores, the connecting bores having axes, the axes of the connecting bores being arranged spaced apart from each other at unit spacings, and a plurality of diagonal struts for connecting the receiving members, each diagonal strut having ends and sides, each diagonal strut comprising transverse connecting bores having axes, the axes of the transverse connecting bores being spaced apart from each other at a distance which corresponds to five times, or a multiple thereof, the unit spacing between the axes of the connecting bores, the axis of each transverse connecting bore extending parallel to the sides of each diagonal strut, two end faces at each end of each diagonal strut, wherein the end faces extend at a right angle relative to each other, wherein one of the end faces defines an angle of 36.87° with a centerline extending through the axes of the transverse connecting bores and the other end face defines an angle of 53.13° with the centerline, and wherein the two end faces at the ends of each diagonal strut defining the angle of 36.87° with the centerline are arranged on opposite sides of each diagonal strut, each end face being spaced from the axis of the adjacent transverse connecting bore by half a unit spacing, and end connecting bores extending perpendicularly to each end face and through the axis of the adjacent transverse connecting bore.

2. The system according to claim 1, wherein the diagonal strut has a square cross-section.

3. The system according to claim 1 wherein each diagonal strut has a rectangular cross-section.

4. The system according to claim 1, wherein each diagonal strut has a height which corresponds to a unit spacing or a multiple thereof.

5. The system according to claim 1, wherein each diagonal strut has a width which corresponds to a unit spacing or a multiple thereof.

6. The system according to claim 1, wherein the transverse connecting bores have a diameter which corresponds to half a unit spacing.

7. The system according to claim 1, wherein the end connecting bores have a diameter which corresponds to half a unit spacing.

8. The system according to claim 1, further comprising at least one additional connecting bore arranged between the transverse connecting bores.

9. The system according to claim 8, wherein the at least one additional connecting bore has a diameter which corresponds to half a unit spacing.

* * * * *